— 2,705,558
Patented Apr. 5, 1955

2,705,558

PERMANENTLY STABLE TRANSPORTABLE LATEX

Alan E. Murray, New York, N. Y.

No Drawing. Application February 5, 1953,
Serial No. 335,400

15 Claims. (Cl. 206—84)

My invention relates particularly to a permanent transportable product containing latex, which is suitable for shipping without deterioration.

Latex is a water-suspension of a self-vulcanized or self-vulcanizable rubber or rubber substitute having incorporated therewith sulfur in some form, and which is sold extensively for commercial use for depositing, whenever desired, the vulcanized rubber or vulcanized rubber substitute, by removal of the water therefrom and/or when acted upon by coagulating or precipitating agents generally of an acid character. It is consequently, of the utmost importance to maintain the pH of the liquid in transit so as to prevent any precipitation by contamination that may occur from the container or the linings thereof. Such contamination could occur even through one or more cracks or denuded places in the linings so as to destroy the useful properties of the latex. I have found, however, that latex made of natural rubber is generally undesirable because of being affected adversely by proximity to any oily materials.

It is, therefore, one object of my invention to provide a stable commercially transportable latex, preferably in a container that is somewhat flexible, and preferably of neoprene latex which will retain its properties permanently notwithstanding contact with oily products and entirely freed from danger of deterioration by contact with deleterious substances of an acid character, even under the rough usage to which transportable packages are subjected in transit. A further object is to accomplish this end without undue weight, or unwarrantable expense in packing and transportation over long distances. Glass and baked enamel linings are, therefore, not usable for this purpose.

I have found that inexpensive flexible sheet metal containers made of flat sheet iron, which may be tinned or not, are suitable for this purpose but that the soldering materials necessary to be used in the joints thereof, which are generally of an acid character, are destructive to the pH of the neoprene latex, and that the inner walls of these sheet metal containers, the surfaces of which are ofttimes oily due to handling, can be effectively, completely and permanently covered, so as not to affect the pH of the neoprene latex, by applying thereto a bituminous tar such as asphalt or petroleum tar. This may be made by melting and heating asphalt in an open vessel long enough and at a sufficiently high temperature, for instance 160° to 170° C., to leave as a product, after removing solid mineral substances therefrom, a residue which is dark brown having a conchoidal fracture and a mineral oil odor, which melts between 160° and 180° C. A lower-melting asphalt tar is not suitable as the interior walls would not remain completely covered thereby, for the reason that it would flow downwardly so as not to effectively and permanently cover the internal walls and solder of the container, after having been melted and flowed over the entire interior of the metal container, and as under high atmospheric temperatures the coating in the metal container would tend to soften so as to denude the interior walls thereof in places. Also, a higher-melting product, when being applied, would tend to melt the solder and be dangerous in handling, due to the heat and fire hazards. Furthermore, other tars, such as wood-distillation tar, are unsuitable owing to the residual acetic acid that may be retained therein, tending to coagulate or precipitate the vulcanizable neoprene.

In operation, after the asphalt tar has been heated to melt the same to a temperature of between 160° and 180° C., about a pint thereof is introduced into, for example, a two-quart tinned sheet iron container having rectangular sides one or more joints of which at the edges have been fastened or made tight with the aid of a tin-lead solder and a solid or liquid soldering material, such as rosin or hydrochloric acid. The liquefied asphalt tar is then swashed around in the container until the entire interior thereof is covered, after which, while still molten, the excess of the said product, which does not remain adherent to the inner walls, is poured out of the filling opening, care being taken by providing any desired heat-insulating covering around the container to avoid burning the hands, etc., while manipulating the container. The coating that remains covers the entire interior surface of the walls in the container and it is found that the coating will not settle to the bottom so as to uncover any portion of the interior walls but will set immediately to remain thereon as a permanent integral adherent covering notwithstanding bending or denting the container. The container is then filled with neoprene latex, which may have the consistency of a thin cream and the container is then closed and/or sealed in any desired way, as for instance with a stopper or cap of any desired material, the surface of which is unaffected by the neoprene latex, for example, when coated with the same coating material as the interior walls, or any other suitable way.

It has been found, that the package of neoprene latex thus prepared will remain permanently stable and unchanged for years without change and without affecting the character or properties of the neoprene latex, and notwithstanding shipment thereof with the usual rough handling, even to distant and out-of-the-way places of the world. Without this coating the metal container would be quickly eaten through the walls thereof.

While I have described my invention above in detail I wish it to be understood that many changes may be made therein without departing from the spirit of the same.

I claim:

1. A transportable shipping unit comprising a permanently-stable package of a self-vulcanizable water-suspension of a rubberlike material completely enclosed within a tar-coated iron container inert to the material enclosed therein, the coating thereof being free of volatile solvents and having a melting point of about 160° to 180° C.

2. A transportable shipping unit comprising a permanently-stable package of a self-vulcanizable water-suspension of neoprene completely enclosed within an asphalt tar-coated iron container inert to the material enclosed therein, the coating thereof being free of volatile solvents and having a melting point of about 160° to 180° C.

3. A transportable shipping unit comprising a permanently-stable package of a self-vulcanizable water-suspension of a rubberlike material completely enclosed within a tar-coated iron container inert to the material enclosed therein made of flexible sheet metal, the coating thereof being free of volatile solvents and having a melting point of about 160° to 180° C.

4. A transportable shipping unit comprising a permanently-stable package of a self-vulcanizable water-suspension of neoprene completely enclosed within an asphalt tar-coated iron container inert to the material enclosed therein made of flexible sheet metal, the coating thereof being free of volatile solvents and having a melting point of about 160° to 180° C.

5. A transportable shipping unit comprising a permanently-stable package of a self-vulcanizable water-suspension of a rubberlike material completely enclosed within a tar-coated iron container inert to the material enclosed therein made of flat flexible sheet metal joined together with solder, the coating thereof being free of volatile solvents and having a melting point of about 160° to 180° C.

6. A transportable shipping unit comprising a permanently-stable package of a self-vulcanizable water-suspension of neoprene completely enclosed within an asphalt tar-coated iron container inert to the material enclosed therein made of flat flexible sheet metal joined together with solder, the coating thereof being free of volatile solvents and having a melting point of about 160° to 180° C.

7. A sheet iron metal container, carrying neoprene latex completely enclosed therein, the interior walls of which are covered by a set asphalt tar inert to said latex and free of volatile solvents.

8. A sheet iron metal container, carrying neoprene latex completely enclosed therein, the interior walls of which are covered by a set asphalt tar inert to said latex and free of volatile solvents and which melts approximately between 160° and 180° C.

9. A sheet iron metal container, having flexible flat walls fastened together by soldering, carrying neoprene latex completely enclosed therein, the interior walls of which are covered by a set asphalt tar inert to said latex and free of volatile solvents.

10. A sheet iron metal container, having flexible flat walls fastened together by soldering, carrying neoprene latex completely enclosed therein, the interior walls of which are covered by a set asphalt tar inert to said latex and free of volatile solvents and which melts approximately between 160° and 180° C.

11. A sealed sheet iron metal container, carrying neoprene latex completely enclosed therein, the interior walls of which are covered by a set asphalt tar inert to said latex and free of volatile solvents, the container having a filling opening which is made tight by a closure non-reactive to neoprene latex.

12. A sealed sheet iron metal container, carrying neoprene latex completely enclosed therein, the interior walls of which are covered by a set asphalt tar inert to said latex and free of volatile solvents and which melts approximately between 160° and 180° C., the container having a filling opening which is made tight by a closure non-reactive to neoprene latex.

13. A sealed sheet metal container, having flexible flat walls fastened together by soldering, carrying neoprene latex completely enclosed therein, the interior walls of which are covered by a set asphalt tar inert to said latex and free of volatile solvents, the container having a filling opening which is made tight by a closure non-reactive to neoprene latex.

14. A sealed sheet iron metal container, having flexible flat walls fastened together by soldering, carrying neoprene latex completely enclosed therein, the interior walls of which are covered by a set asphalt tar inert to said latex and free of volatile solvents and which melts approximately between 160° and 180° C., the container having a filling opening which is made tight by a closure non-reactive to neoprene latex.

15. A sheet-iron metal container, carrying a self-vulcanizable water-suspension of a rubberlike material completely enclosed therein, the interior walls of which are covered by a set asphalt tar inert to said material and free of volatile solvents.

References Cited in the file of this patent

UNITED STATES PATENTS

| | | |
|---|---|---|
| 1,607,626 | Hopkinson | Nov. 23, 1926 |
| 2,015,290 | Sanders | Sept. 24, 1935 |
| 2,041,392 | Bean et al. | May 19, 1936 |
| 2,056,894 | Bretschger | Oct. 6, 1936 |
| 2,396,633 | Bernstein | Mar. 19, 1946 |
| 2,572,959 | Sparks et al. | Oct. 30, 1951 |